(12) United States Patent
Fleischer et al.

(10) Patent No.: US 6,895,999 B2
(45) Date of Patent: May 24, 2005

(54) ELECTROMAGNET VALVE, IN PARTICULAR FOR AUTOMATIC GEARBOXES

(75) Inventors: Walter Fleischer, Stuttgart (DE); Wolfgang Rudolf, Ludwigsburg (DE); Christof Ott, Asperg (DE); Juergen Semler, Altdorf (DE); Martin Krohn, Weinstadt (DE); Bernd Huber, Schorndorf (DE); Jens Dorfschmid, Notzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/479,661

(22) PCT Filed: Dec. 19, 2002

(86) PCT No.: PCT/DE02/04667

§ 371 (c)(1),
(2), (4) Date: Dec. 4, 2003

(87) PCT Pub. No.: WO03/056404

PCT Pub. Date: Jul. 10, 2003

(65) Prior Publication Data

US 2004/0173269 A1 Sep. 9, 2004

(30) Foreign Application Priority Data

Dec. 21, 2001 (DE) .......................................... 101 63 235

(51) Int. Cl.⁷ ............................................. F15B 13/044
(52) U.S. Cl. .................................................. 137/596.17
(58) Field of Search .................................... 137/596.17

(56) References Cited

U.S. PATENT DOCUMENTS 5,234,030 A 8/1993 Kervagoret
5,445,448 A 8/1995 Wolff et al.
5,522,426 A 6/1996 Zutt et al.
5,704,587 A 1/1998 Kuromitsu et al.
5,791,628 A 8/1998 Wolff
5,836,659 A 11/1998 Feigel et al.
6,022,086 A 2/2000 Braum
6,189,985 B1 2/2001 Fritsch et al.
6,209,563 B1 4/2001 Seid
6,328,065 B1 12/2001 Schmid et al.
6,554,027 B1 4/2003 Schuurman
6,719,006 B2 * 4/2004 Fleischer et al. ...... 137/596.17
6,779,558 B1 * 8/2004 Bruck et al. ........... 137/625.65

FOREIGN PATENT DOCUMENTS

| DE | 34 17 383 A1 | * | 11/1985 |
| DE | 40 26 231 A1 | | 2/1992 |
| DE | 44 26 110 | | 1/1996 |
| DE | 197 33 660 A1 | | 2/1999 |
| DE | 198 49 877 | | 9/1999 |
| DE | 199 43 066 | | 3/2000 |
| DE | 199 04 902 A1 | * | 8/2000 |
| DE | 199 43 532 | | 11/2000 |
| WO | WO 01/33307 A2 | * | 5/2001 |

* cited by examiner

Primary Examiner—Gerald A. Michalsky
(74) Attorney, Agent, or Firm—Michael J. Striker

(57) ABSTRACT

The invention proposes a solenoid valve (10), in particular for automatic transmissions of motor vehicles. Solenoid valves (10) have the problem of vibrations that detract from shifting comfort. Integrating a throttle restriction (52) into the solenoid valve (10) on the part of the solenoid valve (10) oriented toward the consumer as proposed by the invention makes it possible to efficiently reduce such vibrations. In addition, the production costs are low, in particular because the throttle restriction (52) is provided In a filter cage (44) of the solenoid valve (10).

3 Claims, 1 Drawing Sheet

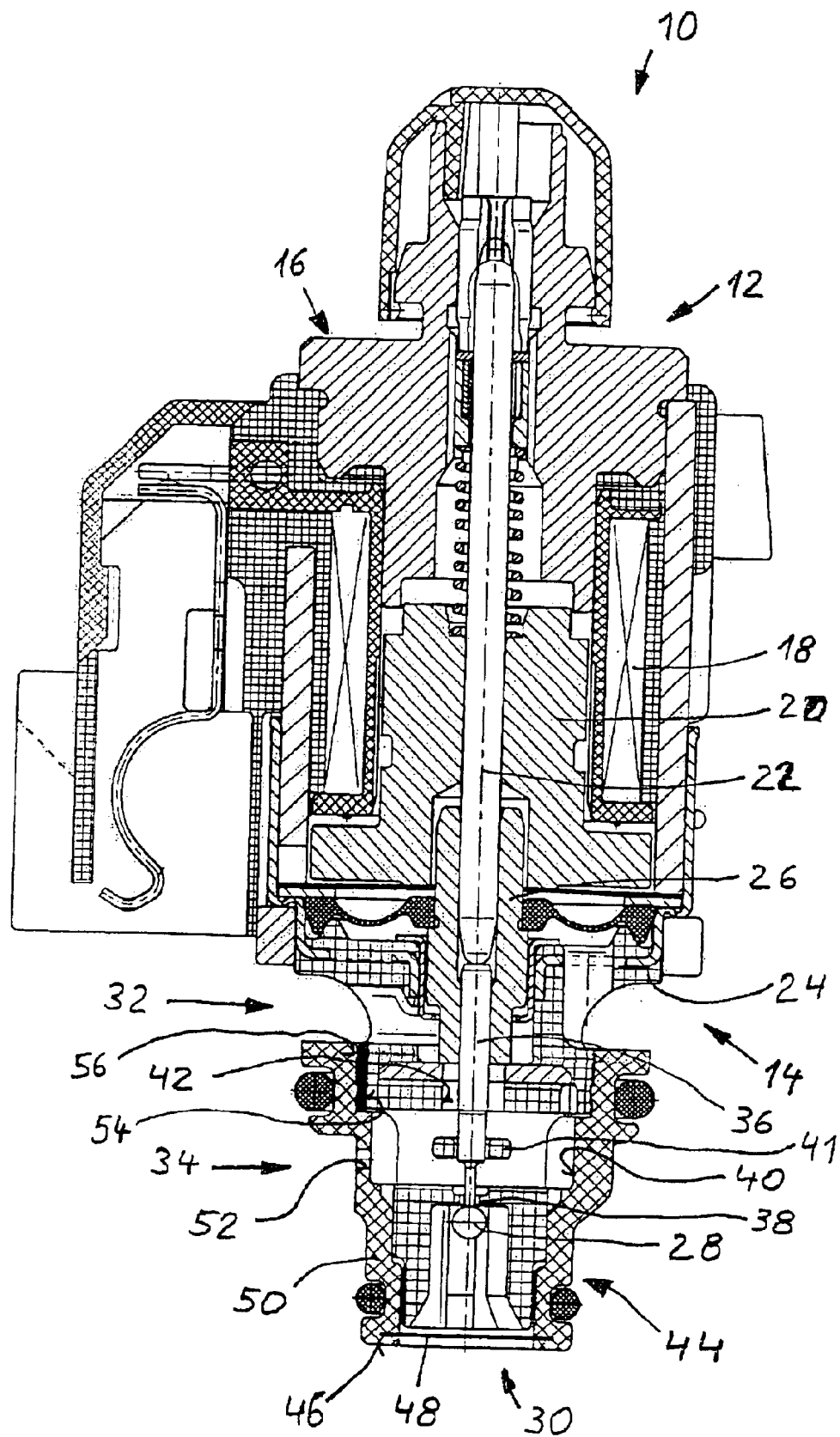

ELECTROMAGNET VALVE, IN PARTICULAR FOR AUTOMATIC GEARBOXES

BACKGROUND OF THE INVENTION

The invention is based on a solenoid valve, in particular for automatic transmissions, as is known, for example, from DE 197 33 660 A1.

In the hydraulic control of automatic transmissions, the problem arises that hydraulic vibrations can occur, which detract from the shifting comfort and shorten the service life. It is possible to reduce or even prevent the occurrence of these vibrations among other things by means of throttle restrictions in the form of apertures placed between the hydraulic actuators. Apertures between pressure regulators and follower valves are particularly suitable means for these vibrations. These apertures are usually accommodated structurally somewhere in the lines between the pressure regulator and the consumer or in a so-called intermediate plate. The apertures are usually provided in a position determined based on structural circumstances, between the pressure regulator and a follower valve, in a passage through an intermediate plate.

SUMMARY OF THE INVENTION

The solenoid valve according to the invention, in particular for an automatic transmission, has the advantage over the prior art that a throttle restriction is provided in a simple manner by being integrated into the solenoid valve. The position of the throttle restriction relative to the solenoid valve is unambiguously established due to its integration into the solenoid valve so that it is placed at the position of its greatest effectiveness, which reduces application costs for the manufacturer of the hydraulic control system.

It is particularly useful to provide the throttle restriction in the consumer connection or working pressure connection of a filter cage of the solenoid valve. For technical manufacturing reasons, the throttle restriction is particularly easy to produce at this location.

The filter cage produces a seal between the pressure chamber in which the working pressure is generated inside the solenoid valve and a receiving bore for the solenoid valve. An oil exchange can only occur via the integrated aperture. It is very easy to adapt the loss coefficient of the throttle restriction to the given requirements by changing its diameter and length.

Integrating the throttle restriction into the filter cage reduces the cost of the entire system since the throttle restriction is less expensive to produce in the filter cage than in an intermediate plate. Since the effectiveness of the throttle restriction in the filter cage depends on the relative position or distance from the solenoid valve, the placement of the throttle restriction according to the invention allows its diameter to be selected as larger than in an intermediate plate. This gives it a decisive functional advantage at low temperatures since this shortens the so-called step response times.

Alternatively, the throttle restriction can also be integrated directly into the connection fitting or flange of the solenoid valve.

Another advantage of the solenoid valve according to the invention is that as part of the development and manufacturing process, it can be tested together with the throttle restriction that exerts a powerful influence on the valve hydraulics, a combined testing that results in a perceptible quality improvement.

A special shaping of the throttle restriction (e.g. step-shaped, conical, etc.) in order to optimize the dynamic behavior is easier to produce through the plastic injection-molding technique of the filter cage than it is to produce in an intermediate plate by means of a stamping or drilling tool.

There are other possible applications in which the orientation of the throttle restriction in the circumference direction is crucial for optimizing the functioning of the throttle restriction. In such cases, the filter cage and the valve part can be provided with a rotation prevention means.

Other advantages and advantageous modifications of the invention ensue from the dependent claims and the description.

BRIEF DESCRIPTION OF THE DRAWINGS

An exemplary embodiment of the invention is shown in the drawing and will be explained in detail in the description that follows.

The sole FIGURE shows a longitudinal section through a solenoid valve.

DETAILED DESCRIPTION OF THE PREFERRED EMBODIMENTS

The sole FIGURE shows a solenoid valve 10, in particular for use in automatic transmissions of motor vehicles. In the current exemplary embodiment, the solenoid valve 10 is used as a pressure regulating valve for controlling actuators in automatic transmissions. Alternatively, it can also be an electromagnetically pilot-operated valve.

The solenoid valve 10 has a magnet part 12 and a valve part 14 disposed flush with it. The magnet part 12 essentially includes housing 16, a coil 18, and a movable armature 20 that contains an armature rod 22. The valve part 14 is connected to the magnet part 12 by means of a connection fitting 24. In addition to the connection fitting 24, the valve part 14 also has an actuating element 26 and a ball-shaped closing element 28. The connection fitting 24 is provided with an inlet 30, a return 32, and a consumer connection 34. The armature 20 causes the actuating element 26 to move. The closing element 28 is situated inside the inlet 30 and is actuated by a tappet 36 disposed inside the actuating element 26. The tappet 36 acts on the closing element 28 by reaching through a bore 38 provided between the inlet 30 and a pressure chamber 40 of the consumer connection 34, in which the working pressure is generated inside the solenoid valve 10. Inside the pressure chamber 40, the tappet 36 passes through a baffle plate 41. The tappet 36 extends further through the pressure chamber 40 and a bore 42 provided between the pressure chamber 40 and the return 32, and is finally fastened inside the actuating element 26. The actuating element 26 can open and close the bore 42.

A filter cage 44 is provided on the valve part 14. The filter cage 44 is essentially cup-shaped; the filter cloth 48 is placed at the bottom 46 and the annular wall 50 seals off the pressure chamber 40 except for a throttle restriction 52, for example in the form of an aperture, provided in the wall 50. The throttle restriction 52 is integrated into the filter cage 44 and consequently into the solenoid valve 10. This offers advantages with regard to the precision of the damping action and that of the manufacture. The fact that the throttle restriction 52 is integrated into the solenoid valve 10, not spaced apart from it by a distance that varies according to structural dictates as a function of the different installation positions, permits better control of the damping action. Since the filter cage 44 is a plastic injection-molded part, the throttle restriction 52 can easily be provided during manufacture.

Alternatively, it is also possible to integrate the throttle restriction 52 into the pressure chamber of the valve part 14. As in the current exemplary embodiment, with a solenoid valve 10 that is embodied as a plastic injection-molded part with a correspondingly embodied slide valve, this integration can be achieved during manufacture. It is also possible for the throttle restriction 52 not to be provided in the filter cage 44 itself. For example, if a filter cage 44 is not required, then with the solenoid valve 10, the throttle restriction 52 can be integrated into a sleeve that is placed around the pressure chamber 40.

The filter cage 44 or alternatively a sleeve is fastened to the valve part 14 in a rotationally fixed manner. To this end, a projection 54 is provided on the filter cage 44 or alternatively on the sleeve, and a corresponding recess 56 is provided on the valve part 14. However, a recess can also be provided on the filter cage 44 or alternatively on the sleeve. The projection 54 can, for example, be embodied as a lug or rib and the recess can be embodied as a depression or groove. However, other possibilities for preventing rotation are also conceivable.

The throttle restriction 52 has a diameter of approx. 1 mm, and the length is somewhat shorter than this. However, it is possible to use experimentation, for example, to determine the optimal ratio of length to diameter for each intended application. In addition, it is not absolutely necessary for the throttle restriction 52 to have a round cross section. Conical and stepped diametrical progressions are also conceivable. It is important that the throttle restriction 52 be integrated into the solenoid valve 10, on the part of the solenoid valve 10 oriented toward the consumer.

What is claimed is:

1. A solenoid valve (10), for automatic transmissions, comprising, a magnet part (12) and a valve part (14), wherein an actuating element (26) that is actuatable by an armature (20) of the magnet part is disposed in the valve part (14), wherein the valve part has a pressure chamber (40) and a connection fitting (24) with an inlet (30), a return (32), and a consumer connection (34) branching off from the pressure chamber, and wherein between the pressure chamber and the return, a first bore is formed, wherein said first bore is closeable by the actuating element, wherein between the pressure chamber and the inlet, a second bore is formed, wherein said second bore is closeable by a closing element actuated by the actuating element, wherein a throttle restriction (52) is integrated into the solenoid valve (10) between the consumer connection (34) and the pressure chamber (40).

2. The solenoid valve (10) according to claim 1, wherein the throttle restriction (52) is formed on a filter cage (44) associated with the valve part.

3. The solenoid valve (10) according to claim 2, wherein the throttle restriction (52) is provided in a wall (50) of the filter cage (44) that encompasses a pressure chamber (40) of the valve part.

\* \* \* \* \*